July 20, 1971  E. COEN ET AL  3,594,259

CONTINUOUS HEAT TREATMENT OF GLASS-FORMING MATERIALS

Filed March 12, 1968  2 Sheets-Sheet 1

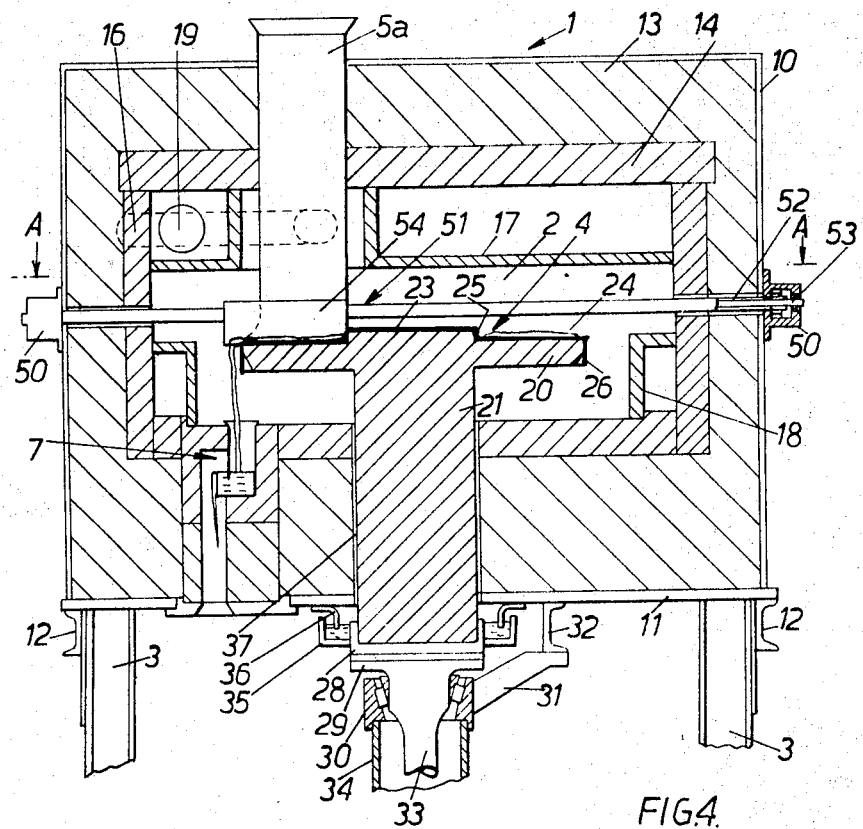
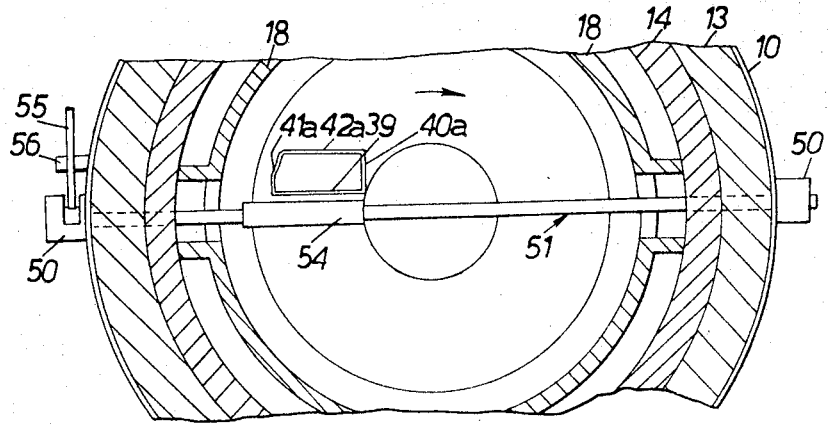

United States Patent Office 3,594,259
Patented July 20, 1971

3,594,259
CONTINUOUS HEAT TREATMENT OF GLASS-FORMING MATERIALS
Ernesto Coen, Liverpool, John Victor Alderson, Southport, and Robert Smith, Ormskirk, England, assignors to Pilkington Brothers Limited, Liverpool, Lancashire, England
Filed Mar. 12, 1968, Ser. No. 712,559
Claims priority, application Great Britain, Mar. 15, 1967, 12,233/67
Int. Cl. C03b 5/26
U.S. Cl. 65—134         14 Claims

ABSTRACT OF THE DISCLOSURE

Molten glass is produced by continuously distributing glass-forming materials onto a moving (e.g. a rotating) hearth, exposing the materials to high temperature while the materials remain stationary relative to the hearth and are moved by the hearth through a furnace chamber to convert the materials into molten glass, and directing the molten glass over an edge of the hearth as a continuous stream.

BACKGROUND OF THE INVENTION

(1) Field of the invention

The present invention relates to the continuous heat treatment of materials, for example for producing a continuous stream of molten glass, and to a furnace for use in the continuous heat treatment of materials.

(2) Description of the prior art

In conventional processes for continuously producing molten glass, glass-forming materials are fed into one end of a melting furnace in which the materials react together, and molten glass is continuously withdrawn from the other end of the furnace. Usually the furnace is divided into two or more sections, and within the sections there may be some non-uniform forward and reverse flows of the molten glass, and some portions of the molten glass may be stagnant. As a consequence it is not possible to ensure that all of the glass undergoes the same heating cycle during its passage through the furnace.

The present invention provides a glass melting process in which all parts of the glass-forming materials undergo substantially the same heating cycle, and in which stagnancy or reverse flows in the molten glass are minimised.

The invention further provides a furnace for the continuous heat treatment of materials in which all the materials undergo substantially the same heating cycle.

SUMMARY

According to one aspect of the present invention, a method of producing a continuous stream of molten glass comprises continuously and evenly distributing glass-forming materials onto a hearth, exposing the glass-forming materials on the hearth to high temperature while said materials remain stationary relative to the hearth thereby continuously converting the said materials into molten glass, and continuously and progressively removing the molten glass from the hearth at the same rate at which the materials are distributed on to the hearth.

Preferably the glass forming materials are distributed onto an annular area of hearth, and the hearth is rotated in a horizontal plane so that the glass-forming materials are moved by the hearth along a circular path, the materials being exposed while on the hearth to high temperature whereby the materials are continuously converted into molten glass during less than one revolution of the hearth.

The term "stationary relative to the hearth" is to be understood to mean that there is very little relative movement between the hearth and the layer of glass thereon, and as a consequence all the glass undergoes virtually the same heating cycle. Closely controlled time/temperature cycles can therefore be used with this process, and since no glass is maintained at high temperature for an overlong period the process is thermally efficient.

The glass-forming materials which are distributed on the hearth are preferably in the form of pellets of mixed and compacted batch, which begin to react on contact with the hearth, and which are completely converted into homogeneous molten glass during less than one revolution of the hearth. In certain processes, however, it may be preferred to use pre-reacted batch or glass itself as the starting material. Consequently, the term "glass-forming material" should be taken to include both mixed and pre-reacted batch, and glass itself.

According to a further aspect of the invention, a furnace comprises a heating chamber, a refractory hearth disposed horizontally in the heating chamber, delivery means for continuously and evenly distributing materials to be heated onto the hearth, discharge means mounted in fixed relationship to the said delivery means for directing a flow of heat treated material from the hearth towards an outlet, and means for providing relative movement between the hearth and the delivery and discharge means.

The hearth may be circular, and the relative movement between the hearth and the delivery and discharge means may be relative rotation.

In a preferred form of the invention, the circular hearth is mounted on a rotatable member disposed within the heating chamber, and the delivery and discharge means are stationary.

The terms "fixed relationship" and "stationary" as applied to the delivery means and discharge means refer to the fact that these either move together relative to the hearth, or remain stationary in the heating chamber in which the hearth moves; nevertheless the discharge means in particular may have limited movement, for example vertically or radially, in accordance with the manner of discharge of the heat treated materials.

The discharge means may be a scraper. Where the furnace is to be used for converting batch into molten glass, hard materials or stones may remain unmelted in the molten glass, and in order to avoid such stones damaging the scraper the scraper may be mounted so as to be deflectible to allow the passage of stones thereunder. For this purpose the scraper may be mounted on a rotatable shaft.

In a preferred arrangement, particularly for producing molten glass, the hearth is annular and the upper surface thereof is horizontal with a raised flange on its inner periphery and a flat outer rim. In this case the rate of feed of the glass-forming materials onto the hearth and the residence time of the materials on the hearth must be so regulated with regard to the temperature as to produce a layer of molten glass of such thickness as to be retained on the hearth by surface tension until directed off the flat outer rim of the hearth as a continuous stream by the discharge means, which in this case comprises a scraper blade extending across a radial portion of the hearth.

The molten glass falls from the edge of the hearth into an outlet channel located vertically below the point where the scraper blade overlies the rim of the hearth. In this embodiment the hearth preferably includes a metal hearth plate the outer edge of which overhangs the outer edge of a refractory support member.

As an alternative to this arrangement, the molten glass may be withdrawn upwardly from the hearth, for example by means of suction, or by rollers between which a strip of molten glass is raised. If rollers are used to remove glass in the vertical direction, then the glass on the hearth should preferably pass through a cooling zone to increase the viscosity before discharge.

In the arrangement in which the molten glass or other molten material falls from the hearth into an outlet channel, this channel may include a liquid trap in which the molten material is retained in such manner as to seal the outlet channel against ingress of air into the heating chamber. Where, however, the process is to be used for the production of glass fibres, the molten glass may fall directly into an outlet which includes a bushing from which glass fibres may be drawn without allowing ingress of air into the furance chamber.

The delivery means may include a chute for delivering materials to be treated from feeding means onto the hearth.

When the glass-forming material is in the form of unreacted batch, this batch reacts vigorously on contacting the hot hearth, with bubbling and effervescence. In the preferred arrangement in which the hearth has a flat outer edge, there is a danger that the movement of the reacting material caused by its bubbling may prevent the surface tension from retaining the material on the hearth, in which case some of the material would spill over the outside edge of the hearth near to the area of the hearth receiving the unreacted batch. To prevent this, the chute for feeding the batch onto the hearth is associated with an enclosure at least partially defining an area of the hearth onto which the batch is fed, the enclosure having at least one wall spaced sufficiently close to the hearth to inhibit movement of the reacting batch toward the flat edge of the hearth. This enclosure also retains the foam formed during the reaction of the batch so that this foam does not pass into the heating chamber.

In a preferred embodiment the furnace is gas-fired and includes a refractory muffle horizontally disposed above the hearth and separating the hearth from the gas burners which heat the upper surface of the muffle so that the muffle radiates heat onto the charge held by the hearth.

DESCRIPTION OF THE PREFERRED EMBODIMENT

Figure 1:
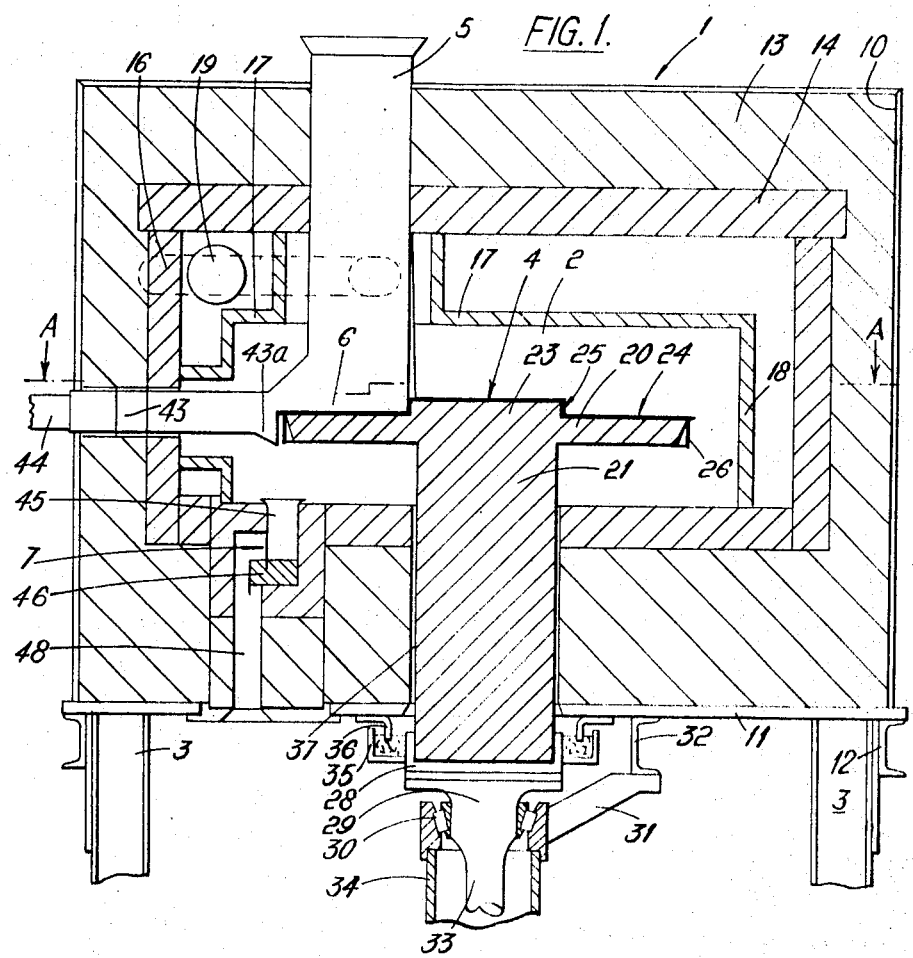
FIG. 1 is a sectional elevation of a glass melting furnace according to the invention.
Figure 2:
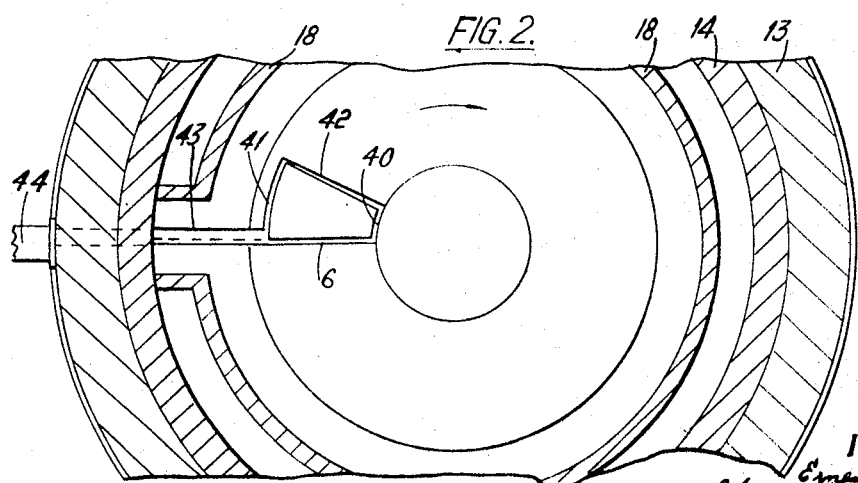
FIG. 2 is a fragmentary sectional plan view on line AA of FIG. 1, and FIGS. 3 and 4 are similar views of a furnace with a modified scraper arrangement.

Referring to FIGS. 1 and 2, the furnace 1 comprises a circular heating chamber 2, a rotary member 4 carrying an annular refractory hearth disposed horizontally within the heating chamber, said rotary member being rotatably supported on a shaft 33 situated below the furnace, delivery means in the form of a chute 5 by which batch may be continuously and evenly distributed onto the hearth as the hearth rotates, and discharge means in the form of a scraper blade 6 mounted in a fixed relationship to the delivery means for directing a stream of molten glass from the hearth into an outlet channel 7.

The furnace 1 is enclosed within a steel casing 10 which includes base plate 11, this base plate being rigidly supported by channel members 12 attached to columns 3 by which the furnace is supported above floor level. The furnace is lined with an outer layer 13 of insulating and refractory brick and an inner layer 14 of sillimanite. The heating chamber 2 is heated by gas burners 16, which produce hot combustion products circulating over a refractory muffle 17, 18 and leaving the furnace by flue 19. The muffle 17, 18 radiates heat into the chamber 2 while excluding the products of combustion therefrom, and the muffle portion 17 is horizontally disposed above the rotary member 4 so as to radiate heat directly onto a charge thereon while the upper surface of the muffle is heated by burners 16. The furnace is capable of maintaining a temperature of 1500° in chamber 2.

The rotary member 4 comprises a sillimanite moulding having a horizontally rotatable disc portion 20 integral with a shaft 21. The disc portion 20 has a flat upper annular hearth area and a raised central boss 23. The hearth area is overlaid with a refractory hearth plate 24 of platinum/rhodium alloy 0.02 inch thick. This hearth plate 24 is entirely horizontal except for a raised flange 25 on its inner periphery in contact with the raised boss 23, and has a flat outer rim overhanging the outer edge of the support disc 20 by a small amount. A collar 26 is attached to the underside of the overhanging outer rim to prevent any accidental contact between glass flowing off the plate 24 and the edge of the disc portion 20.

The shaft 21 extends vertically through a circular bore in the centre of the base of the furnace, and is supported by a steel end cap 28 attached to a hub 29 which is rotatable in a roller bearing 30. The outer ring of the roller bearing 30 is carried by three mountings 31 bolted to channel members 32 which form part of the furnace structure. The hub 29 has an extension in the form of a vertical shaft 33, which is rotatable in the direction indicated by the arrow in FIG. 2 at a speed adjustable between say one to six revs. per hour by rotating means including a motor and gear-box combination of conventional type (not shown) situated below the furnace. A tube 34 is supported on the outer ring of the bearing 30 and holds a second bearing (not shown) at its lower end.

The shaft 33 is hollow, and has ports which allow for cooling air to enter below the bearing 30 and further ports through which the air can escape between the upper end thereof and the cap 28. The cooling air enters through holes in the tube 34 and then passes through the ports in shaft 33 and circulates up through the shaft 33 by natural convection.

Surrounding and fixed to the end cap 28 is an annular trough 35 filled with sand, and a circular fillet 36 attached to the furnace base 11 is arranged so that its lower edge is submerged in the sand, this arrangement providing a sand seal which prevents air being drawn into the furnace chamber through the annular space 37 around the shaft 21.

The chute 5, which is of rectangular cross-section, extends through the roof of the furnace and is positioned so as to deliver batch from feeding means (not shown) onto a radial portion of the hearth plate 24. The chute 5 is of platinum/rhodium alloy and diverges slightly at its lower end to form an enclosure as shown in FIG. 2. The front wall of this enclosure is combined with the platinum alloy scraper blade 6 which is nearly in contact with the plate 24 across a radius thereof, and the curved side walls 40 and 41 of this enclosure are also held close to the plate 24. The rear wall 42 of the enclosure is slightly raised from the surface of plate 24. The scraper blade 6 has a radial extension 43, and spring means within an adjustable holder 44 act on extension 43 to maintain light contact between a tooth 43a of the scraper blade and the outer edge of the plate 24. The chute 5 provides the only vent from the chamber 2. The terms "front" and "rear" as applied to the enclosure refer to the walls which are respectively the first and last walls to overlie a particular point on the hearth as it rotates.

Vertically below the edge of the plate 24 at the point of contact with scraper blade 6, there is provided a platinum-alloy lined discharge channel 7 for molten glass. An upper part 45 of the channel has its lower opening below the level of molten glass retained in a liquid trap formed by a pocket 46. This trap is arranged as indicated so as to prevent air ingress from a lower part 48 of the channel into the upper part 45 while allowing glass to flow from pocket 46 into the channel part 48. The molten glass trap so provided prevents convention currents of cold air flowing through the furnace, as would otherwise occur through the channel 7 and the chute 5.

In operation, batch is continuously fed to the top of the chute 5 at a controlled rate from feeding means not shown, and falls through the chute and is evenly distributed onto the annular hearth plate 24 as this is rotated by the rotating means. The batch is preferably in the form of pellets of mixed and compacted glass-forming materials; in this way de-mixing of the batch is prevented and the amount of powder blown around in the furnace chamber is minimised. On contacting the hot hearth plate 24, the batch begins to react vigorously, but the main part of the reaction is completed within the enclosure bounded by the scraper blade 6 and the walls 40, 41, and 42. These walls inhibit flow of reacting material particularly towards the rim of plate 24, and thereby ensure that the effervescence of the reaction does not cause the reacting mass to spill off the hearth. Furthermore, the enclosure allows gas produced from the reacting batch to be discharged from the furnace through the chute 5.

The batch remains stationary relative to the hearth and is carried around the furnace while being exposed to high temperature, whereby it is converted into molten glass. The rate of batch feed and the rate of rotation of the hearth which determines the residence time on the hearth, are so adjusted with regard to the temperature as to produce a layer of molten glass on the surface of the hearth plate 24 in less than one revolution of the rotary member. The rate of batch feed is also limited by the requirement that, with no raised flange on the outer edge of plate 24, the layer of molten glass produced must be of such a thickness as to be retained on the plate 24 by the effect of surface tension; in practice the layer of glass may be of the order of 0.7 cm. in thickness for normal soda/lime glasses.

As the molten glass reaches the scraper blade 6, the effect of the blade 6 on the molten glass causes a thickening of the glass layer at this point, so that the molten glass flows off the plate 24 as a continuous stream. This flow occurs without the establishment of any stagnant pockets. The molten glass flows under gravity into discharge channel 7, leaving the furnace through the liquid trap described which prevents air ingress. The glass normally flows off the hearth plate 24 at the same rate at which batch is delivered to the hearth, i.e. the glass only remains on the hearth for one revolution.

Where further fining of the glass is required, this may be carried out in a separate channel fed from the discharge channel 7.

The output from this installation partially depends on the thickness of molten glass that can be retained on the hearth plate 24 by surface tension. Consequently it is advantageous to use a material for plate 24 on which the glass has a fairly high contact angle; suitable materials for this are platinum or platinum/rhodium/gold alloys.

The process of this invention may be used for producing molten glass for forming into glass fibres. In this case the stream of molten glass directed off the hearth may fall into a bushing of generally well known type from which glass fibres are drawn; the bushing itself prevents air ingress into the heating chamber and no liquid trap is required. For forming glass fibres, the starting material may be glass itself, e.g. in the form of marbles. In this case, since no reaction occurs when the glass contacts the hearth, the enclosure formed by walls 40, 41 and 42 may be dispensed with.

FIGS. 3 and 4 show a furnace similar to that of FIGS. 1 and 2 in all respects except for a modification of the scraper blade which is in this case mounted separately from the chute 5a and is deflectible to allow hard materials to pass thereunder.

The chute 5a is similar to that shown in FIGS. 1 and 2 but includes a front wall 39 spaced from the scraper blade 54. The remaining walls 40a, and 41a and 42a are arranged to operate in a manner similar to that already described with reference to FIGS. 1 and 2.

Two bearing mountings 50 are situated one at each side of the furnace casing 10, in diametrically opposed positions and both just above the hearth level. These bearing mountings 50 carry between them a shaft indicated at 51 which passes through bores in the sides of the furnace, and passes over the hearth and beneath the muffle 17. The shaft 51 is in two parts, namely an outer tube 52 of recrystallized alumina and an inner tube 53 of silicon carbide, and both tubes are supported each by its own bearings within the mountings 50. The scraper blade 54 it attached to the outer tube 52 just in fornt of the front wall 39, and the blade extends across a radial portion of the hearth 24 and over the outer rim of the hearth.

In the operative position shown, the lower edge of blade 54 is nearly in contact with the hearth plate 24. The blade is normally held in this position by the torque produced by a balance lever 55 attached to the end of shaft 51, which lever is weighted against a stop lug 56. The blade 54 is capable of being deflected so as to rotate the shaft against this torque if struck by a solid object moving with the hearth, such as a stone of unmelted material in the molten glass, the rotation of the shaft raising the blade from the hearth to allow the object to pass thereunder; such hard materials therefrom remain on the hearth until melted.

With glass-forming materials which give rise to the formation of a silica scum on top of the molten glass, a comb-like device may be suspended within the chamber so that the teeth thereof protrude into the scum layer. Such a device may also be used to prevent bubbles adhering to the surface of the hearth plate.

The process and installation as described may be adapted for electrical heating in which case no muffle will be required. One form of electrical heating may be provided by silicon carbide elements mounted around the sides of the furnace enclosure. Another method of electrical heating which may be used involves passing electrical current through the platinum plate 24 by means of conductors brought out of the furnace through the shaft 21. A further possibility is direct resistance heating of the molten glass itself, using the plate 24 as one electrode and having further electrodes dipping into or making contact with the top surface of the glass. The heating means may be arranged to give several zones of heating at different temperatures, whereby the glass can be processed through a closely controllable time/temperature cycle.

We claim:

1. A method of producing a continuous stream of molten glass comprising the steps of continuously and evenly distributing glass-forming materials onto a hearth, moving the hearth in a horizontal plane so that the glass-forming materials are moved by the hearth along a predetermined path, exposing the glass-forming materials on the hearth to high temperature while said materials remain stationary relative to the hearth thereby continuously converting the said materials into molten glass, directing a flow of the molten glass at a predetermined discharge position along said path, over an edge of the hearth, and continuously and progressively removing the molten glass from the hearth over said edge at the same rate at which the materials are distributed onto the hearth.

2. A method of producing a continuous stream of molten glass comprising the steps of continuously and evenly distributing glass-forming materials onto an annular area of hearth, rotating the hearth in a horizontal plane so that the glass-forming materials are moved by the hearth along a circular path, exposing the materials while on the hearth to high temperature thereby continuously converting the said materials into molten glass during less than one revolution of the hearth, directing a flow of the molten glass over the outer peripheral edge of the annular area of the hearth, and then removing the molten glass from the hearth over said edge as a continuous stream at the same rate at which the materials are distributed onto the hearth.

3. A method according to claim 2, wherein the glass-forming materials are distributed on the hearth in the form of pellets of mixed and compacted batch.

4. A method according to claim 2, wherein the rate of feed of glass-forming materials onto the hearth and the residence time of the materials on the hearth are so regulated with regard to temperature as to produce a layer of molten glass of such thickness as to be retained on the hearth by surface tension until directed off the hearth as a continuous stream.

5. A method according to claim 2, comprising employing the continuous stream of molten glass in the manufacture of glass fibres.

6. A furnace comprising a heating chamber, a refractory hearth disposed horizontally in the heating chamber, delivery means for continuously and evenly distributing onto the hearth glass-forming materials to be heated and thereby converted into molten glass, a scraper mounted in fixed relationship to said delivery means for directing a flow of the molten glass over an edge of the hearth towards an outlet, and means for providing relative movement between the hearth and the delivery means and the scraper.

7. A furnace according to claim 6, wherein the scraper is mounted to be deflectible to allow the passage of hard materials thereunder.

8. A furnace according to claim 7, wherein the scraper is monted on a rotatable shaft.

9. A furnace according to claim 6 wherein the hearth is annular and the upper surface thereof is horizontal with a raised flange around its inner peripheral edge and a flat outer peripheral edge, and the scraper comprises a blade extending across a radial portion of the hearth, the said outlet being located vertically below the point where the scraper blade overlies the outer peripheral edge of the hearth.

10. A furnace according to claim 9, wherein the hearth includes a metad hearth plate mounted on a refractory support member, the outer edge of which plate overhangs the outer of the support member.

11. A furnace according to claim 6, wherein the outlet includes a pocket forming a liquid trap in which the molten glass may be retained in such manner as to seal the outlet against ingress of air into the heating chamber.

12. A furnace according to claim 6, wherein the delivery means includes a chute for delivering glass-forming materials to be treated from feeding means onto the hearth.

13. A furnace according to claim 12, wherein the said chute is associated with an enclosure at least partially defining an area of the hearth onto which the glass-forming materials are fed, said enclosure having at least one wall spaced sufficiently close to the hearth to inhibit movement of reacting materials towards an edge of the hearth.

14. A furnace according to claim 6, which is gas fired and includes a refractory muffle which is horizontally disposed above the hearth and which separates the hearth from burners arranged to heat the upper surface of the muffle.

References Cited
UNITED STATES PATENTS

| | | | |
|---|---|---|---|
| 1,928,598 | 9/1933 | Morton et al. | 65—335X |
| 3,240,584 | 3/1966 | Zellers, Jr. | 65—337 |
| 3,288,581 | 11/1966 | Schweppe | 65—2 |
| 3,345,149 | 10/1967 | Michalik et al. | 65—99 |

S. R. FRIEDMAN, Assistant Examiner

S. R. FRIEDMAN, Assistance Examiner

U.S. Cl. X.R.

65—136, 334, 335, 347